United States Patent [19]

Green et al.

[11] 3,906,873

[45] Sept. 23, 1975

[54] WASTE CONVERTER

[75] Inventors: Harry W. Green, Marine City, Mich.; Ormand F. Cook, Port Clinton, Ohio

[73] Assignee: The Standard Products Co., Cleveland, Ohio

[22] Filed: Apr. 19, 1974

[21] Appl. No.: 462,350

[52] U.S. Cl. .................. 110/7 S; 110/8 C; 110/119
[51] Int. Cl.$^2$ ............................................ F23G 5/12
[58] Field of Search ............ 110/7 R, 7 S, 8 R, 8 C, 110/119

[56] References Cited
UNITED STATES PATENTS

| | | | |
|---|---|---|---|
| 3,362,360 | 1/1968 | Lowe | 110/7 |
| 3,500,775 | 3/1970 | Hubbard | 110/8 |
| 3,521,581 | 7/1970 | Quesnel | 110/8 |
| 3,628,473 | 12/1971 | Maille | 110/8 |
| 3,680,500 | 8/1972 | Pryor | 110/8 |
| 3,698,331 | 10/1972 | Rohr et al. | 110/7 |
| 3,738,289 | 6/1973 | Hanway, Jr. | 110/8 R |
| 3,748,081 | 7/1973 | Hummell | 110/8 |
| 3,822,653 | 7/1974 | Ghelfi | 110/8 |

Primary Examiner—Kenneth W. Sprague
Attorney, Agent, or Firm—Harness, Dickey & Pierce

[57] ABSTRACT

A waste disposal system consists of a combustion chamber for vaporizing and burning sewage and for discharging the same with the products of combustion into a cyclone separator which retains dry solids and discharges the gaseous content.

4 Claims, 2 Drawing Figures

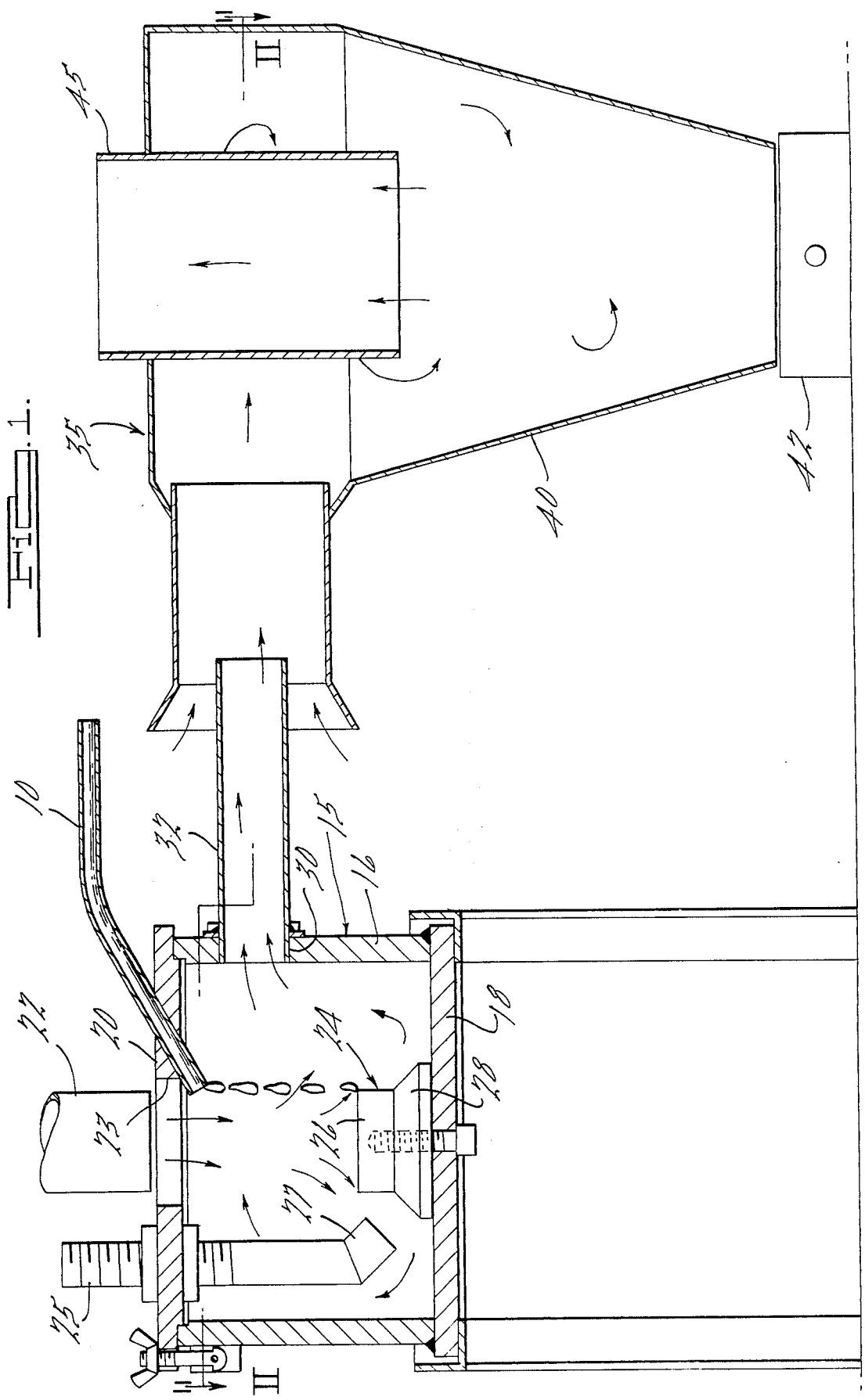

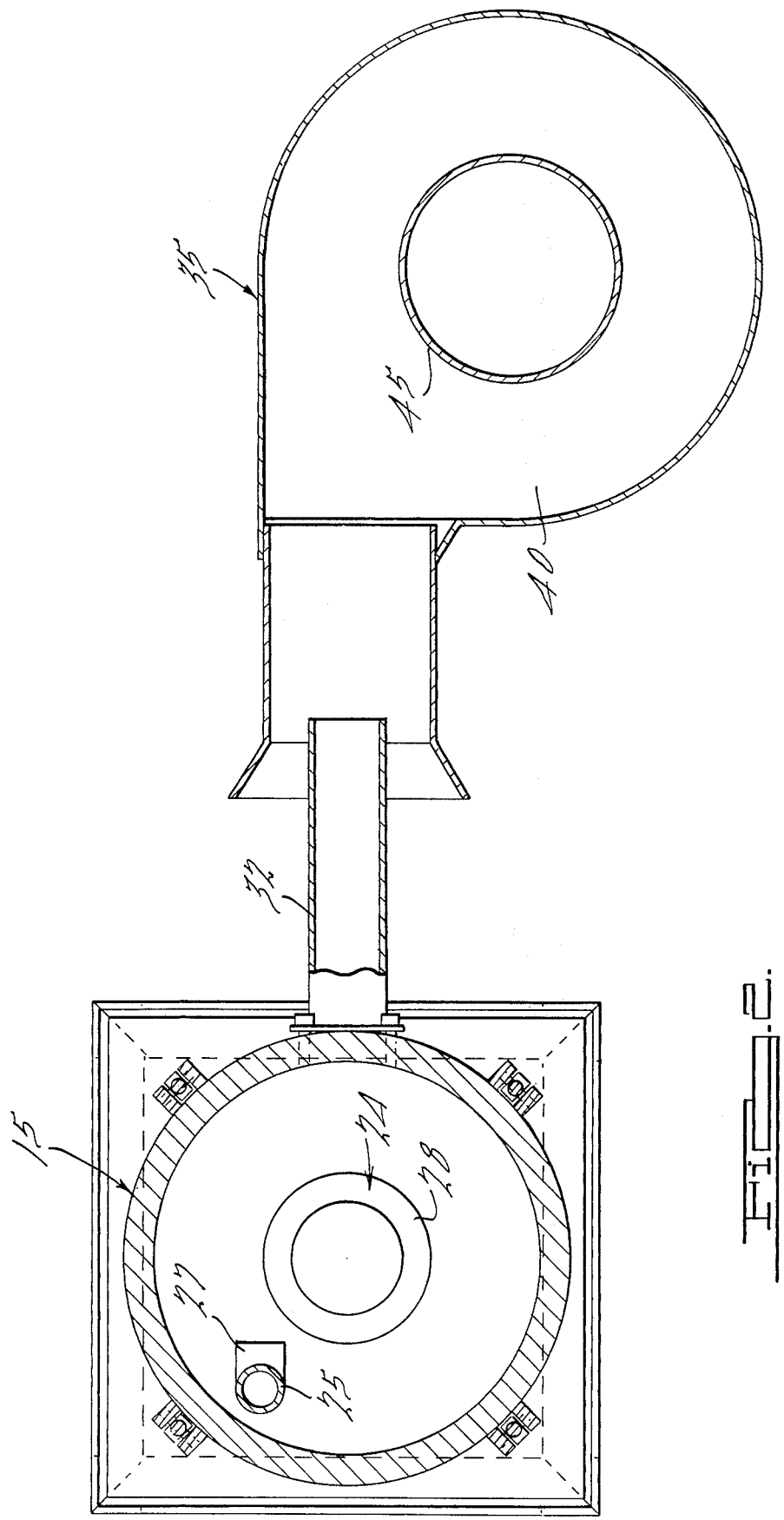

WASTE CONVERTER

BACKGROUND OF THE INVENTION

Increasingly strict Federal and state environmental regulations have made it mandatory to avoid the discharge of untreated sewage from boats and other vehicles, as well as to avoid indiscriminate disposal of sewage in any environment, even remote and rural areas. The discharge of noxious odors into the atmosphere is also undesirable and prohibited in many areas.

Many procedures have been proposed for the disposal of sewage under such difficult conditions as exist where the sanitary facilities are carried by vehicles. The use of heat to vaporize the liquid effluent from the source of sewage, or from an intermediate septic tank, has been proposed. In some instances waste heat from an internal combustion engine or other heat source carried by the vehicle has been employed. Boilers and vaporization chambers have also been employed into which the sewage or liquid effluent is directly introduced. The minerals and organic solids in the liquid eventually form a caked deposit on the internal walls of such boilers or vaporization chambers, act as a heat insulator, and greatly reduce both the volume of the boiler and the efficiency of heat transfer to the boiler walls, so that the boiler is not capable of operating at optimum efficiency, and may also be incapable of vaporizing waste material at the required rate. With the reduction of temperature, noxious odors are also present in greater quantity.

The present invention has as its object to provide an improved disposal system which is very compact and which not only efficiently disposes of the liquid constituents of the sewage, but also traps and prevents discharge of ash and any other solid material which may remain unvaporized. A further object is to provide such a system utilizing a vaporizing chamber which remains clean and is capable of virtually continuous operation at full efficiency. A related object is to provide such a system which fully consumes and oxidizes the odor-causing contents of the sewage, so that the discharged product is inoffensive as to odor, as well as free of living organisms.

Other objects and advantages will become apparent upon consideration of the present disclosure in its entirety.

BRIEF DESCRIPTION OF THE FIGURES OF DRAWING

FIG. 1 is a somewhat diagrammatic vertical cross-sectional view of a sewage disposal system constructed in accordance with the present invention; and FIG. 2 is a horizontal section taken substantially on the line II—II of FIG. 1 and looking in the direction of the arrows.

DETAILED DESCRIPTION OF PREFERRED FORM OF THE INVENTION

The sewage is discharged from a delivery pipe 10 into a cylindrical vaporizing chamber generally designated 15, the sewage being pumped from its source by suitable pumping means (not shown) which is provided with a safety interlock with the burner 22 constituting the heat source, in such manner as to stop the pumping of sewage in event the burner should cease operating prematurely. The chamber 15 is formed of a suitable heat-resistant alloy, having a cylindrical wall 16, a flat base 18 and an openable cover 20. Flaming gases of combustion are directed downwardly axially into the chamber from a gun-type burner 22, which may be oil fired, or operate with any other suitable liquid or gaseous fuel. The capacity of the burner is such as to direct a large volume of flame downwardly against a circular upstanding heat deflector 24 secured to the center of the floor 18. The deflector has an upper portion 26 of substantially cylindrical form, and an enlarged base of truncated conic form, 28, which spreads the flame so that it flows outwardly and upwardly above the floor and up the side walls to, and out of, the flue opening 30, thence through the flue duct 32 to a cyclone separator assembly generally designated 35.

Additional air for combustion is drawn in through the opening 23 for the burner discharge, the opening being larger than the nozzle of the gun. An air supply pipe 25 also extends downwardly through the cover 20 to a position near the bottom of the combustion chamber, where it is equipped with a discharge portion 27 which is directed tangentially. The principal function of the pipe 25 is to act as a blow pipe for cleaning air, which is supplied after each burning cycle to dislodge and expel any deposits or solid material remaining in the combustion chamber. Some secondary air may be supplied through pipe 25 during the burning cycle, however, not only to assist combustion but also to protect the pipe 25 against heat damage.

In operation, the combustion chamber is literally filled with flame, and the sewage is delivered relatively slowly, and drops downwardly against the flame deflector, which, together with the turbulent flame within the chamber, tends to break up the material into very fine particles and quickly vaporizes all liquid constituents thereof. The swirling effect of the air and turbulent flame tend to sweep all ash and solid unburned particles out through the flue duct 32 and into the cyclone separator, which directs the material downwardly as well as rotating it in the conical separating chamber portion 40 of the separator. A collection hopper 42 at the bottom of the chamber 40 receives and holds the solid matter. Since the solid matter constitutes only a small proportion of the constituents, frequent emptying of the hopper is not necessary. The gaseous constituents reverse their flow in the chamber 40 and flow out through the stack 45 after having been so thoroughly heated that all odor-forming constituents are destroyed or oxidized and the principal discharge consists of steam.

After all of the sewage has been vaporized and discharged, the pumping means ceases operation but the burner continues to operate for a predetermined length of time to insure that all sewage has drained from the intake conduit 10 into the enclosed vaporizing chamber and has been vaporized. This also promotes maintaining clean conditions in the intake line 10. After the burner has been extinguished, a high velocity air stream is introduced into the burning chamber through the pipe 25 to blow out any accumulated ash which has remained therein after the burning cycle. Such air also tends to clean the cyclone separator.

This Detailed Description of Preferred Form of the Invention, and the accompanying drawings, have been furnished in compliance with the statutory require to set forth the best mode contemplated by the inventors of carrying out the invention. The prior portions consisting of the "Abstract of the Disclosure" and the "Background of the Invention" are furnished without prejudice to comply with administrative requirements of the Patent Office.

What is claimed is:

1. Sewage disposal means comprising a vaporizing chamber, means for discharging downwardly into the chamber flaming products of combustion at a rate sufficient to maintain the chamber in a flame-filled condition, means for feeding sewage products into the chamber slowly enough so that the chamber remains substantially flame-filled, whereby a high proportion of such sewage products are vaporized and consumed therein, exhaust means connected to an upper portion of said chamber, and separating means in the exhaust means for removing solids from the exhaust.

2. Sewage disposal means comprising a vaporizing chamber, means for discharging into the chamber flaming products of combustion at a rate sufficient to maintain the chamber in a flame-filled condition, and means for feeding sewage products into the chamber whereby a high proportion of such sewage products are vaporized and consumed therein, the vaporizing chamber being in the form of a hollow cylinder having a vertical axis, the first mentioned means comprising a burner arranged to discharge the flaming products of combustion axially downwardly into the chamber, and a generally circular reentrant flame deflecting portion axially positioned near the bottom of said chamber.

3. Sewage disposal means as defined in claim 2 including means for blowing air through said chamber to dislodge and expel solid matter therefrom.

4. Sewage disposal means as defined in claim 2 including means for blowing air through said chamber to dislodge and expel solid matter therefrom, said chamber having a discharge flue, and a solids separator connected to said flue.

* * * * *